US008861924B2

(12) United States Patent
Meads et al.

(10) Patent No.: US 8,861,924 B2
(45) Date of Patent: *Oct. 14, 2014

(54) SYSTEMS AND METHODS FOR RECORDING INFORMATION ON A MOBILE COMPUTING DEVICE

(71) Applicants: Bobby F. Meads, Alpharetta, GA (US); Patrick L. Meere, Odessa, FL (US)

(72) Inventors: Bobby F. Meads, Alpharetta, GA (US); Patrick L. Meere, Odessa, FL (US)

(73) Assignee: Iquest, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/715,824

(22) Filed: Dec. 14, 2012

(65) Prior Publication Data
US 2013/0129311 A1 May 23, 2013

Related U.S. Application Data

(63) Continuation of application No. 13/352,107, filed on Jan. 17, 2012, now Pat. No. 8,358,903.

(60) Provisional application No. 61/553,683, filed on Oct. 31, 2011.

(51) Int. Cl.
*H04N 5/765* (2006.01)
*H04N 21/4788* (2011.01)
*H04N 21/658* (2011.01)
*H04N 21/234* (2011.01)
*G06Q 10/08* (2012.01)
*H04N 21/231* (2011.01)
*H04N 21/414* (2011.01)
*H04N 21/472* (2011.01)

(52) U.S. Cl.
CPC ........... *H04N 5/765* (2013.01); *H04N 21/4788* (2013.01); *H04N 21/6582* (2013.01); *H04N 21/23418* (2013.01); *G06Q 10/087* (2013.01); *H04N 21/231* (2013.01); *H04N 21/41407* (2013.01); *H04N 21/47202* (2013.01)
USPC ............................................ 386/200; 348/86

(58) Field of Classification Search
None
See application file for complete search history.

(56) References Cited

U.S. PATENT DOCUMENTS

| 7,096,030 | B2 | 8/2006 | Huomo |
| 7,913,192 | B2 | 3/2011 | Dicke et al. |
| 8,125,310 | B2 * | 2/2012 | Enkerud et al. ............... 340/3.71 |
| 2002/0051262 | A1 | 5/2002 | Nuttall et al. |
| 2006/0132291 | A1 * | 6/2006 | Dourney et al. ......... 340/286.01 |
| 2006/0241793 | A1 * | 10/2006 | Skourup et al. ................. 700/83 |
| 2007/0281690 | A1 | 12/2007 | Altman et al. |

(Continued)

OTHER PUBLICATIONS

Alexandridis et al, QRDC(QR-Code Distance Client),web site: http://www.csd.uoc.gr/~hy439/labs/Android_projects_overview. pdf 2011, pp. 2,4,6,9.

(Continued)

*Primary Examiner* — Heather Jones
(74) *Attorney, Agent, or Firm* — Brient Globerman LLC

(57) ABSTRACT

A computer-readable medium storing computer executable instructions for: (1) receiving video footage taken by a handheld device; (2) identifying one or more indicia associated with a point of interest within the video footage; (3) using the one or more indicia to retrieve information associated with the point of interest; (4) displaying the information on a display screen associated with the handheld device as the video footage is being displayed on the display screen; and (5) recording a screen capture of the display screen as the display screen is displaying the video footage and information.

13 Claims, 10 Drawing Sheets

(56) References Cited

U.S. PATENT DOCUMENTS

| | | |
|---|---|---|
| 2008/0042840 A1 | 2/2008 | Christopher |
| 2009/0033633 A1 | 2/2009 | Newman et al. |
| 2009/0100018 A1 | 4/2009 | Roberts |
| 2009/0138439 A1 | 5/2009 | Yeung et al. |
| 2009/0319178 A1 | 12/2009 | Khosravy et al. |
| 2010/0076968 A1 | 3/2010 | Boyns et al. |
| 2010/0182341 A1 | 7/2010 | Lee et al. |
| 2010/0279710 A1 | 11/2010 | Dicke et al. |
| 2010/0317368 A1 | 12/2010 | Augst et al. |
| 2010/0328344 A1 | 12/2010 | Mattila et al. |
| 2011/0081919 A1 | 4/2011 | Das et al. |
| 2011/0090080 A1 | 4/2011 | Yu |
| 2011/0143775 A1 | 6/2011 | Liu et al. |
| 2011/0149067 A1* | 6/2011 | Lewis et al. .................. 348/135 |
| 2011/0154174 A1 | 6/2011 | Liu et al. |
| 2011/0199479 A1 | 8/2011 | Waldman |
| 2013/0032634 A1 | 2/2013 | McKirdy |

OTHER PUBLICATIONS

Butchart, Augmented Reality for Smartphones, web site: http://observatory.jisc.ac.uk/docs/AR_Smartphones.pdf, 2011, p. 3.

Yoon et al, QR Code Data Representation for (Mobile) AR; web site: http://www.perey.com/ARStandards/[GIST] QR_Code_Date_Representation_for_AR.pdf, pp. 3,6.

* cited by examiner

SYSTEMS AND METHODS FOR RECORDING INFORMATION ON A MOBILE COMPUTING DEVICE

CROSS REFERENCE TO RELATED APPLICATION

This application is a continuation of U.S. application Ser. No. 13/352,107, entitled Systems and Methods for Recording Information on a Mobile Computing Device, filed Jan. 17, 2012, which claims the benefit of U.S. Provisional Application No. 61/553,683, entitled Systems and Methods for Recording Information on a Mobile Computing Device, filed Oct. 31, 2011. These applications are hereby incorporated herein in their entirety.

BACKGROUND

It is often desirable to share information about a point of interest (e.g., a particular object) with people who are located remotely from the point of interest. In many situations, it is desirable to share such information in a succinct and easy-to-understand format. There is currently a need for improved systems for sharing such information.

SUMMARY OF VARIOUS EMBODIMENTS

A computer-readable medium, according to particular embodiments, stores computer executable instructions for: (1) receiving video footage taken by a handheld device; (2) identifying one or more indicia associated with a point of interest within the video footage; (3) using the one or more indicia to retrieve information associated with the point of interest; (4) displaying the information on a display screen associated with the handheld device; and (5) recording a screen capture of the display screen as the display screen is displaying the video footage and the information.

A computer-readable medium, according to particular embodiments, stores computer executable instructions for: (1) receiving video footage taken by a handheld device; (2) identifying one or more indicia associated with a point of interest within the video footage, the indicia comprising one or more RFID tags; (3) reading the one or more indicia to retrieve information associated with the point of interest; (4) displaying the information on a display screen associated with the handheld device; and (5) recording a screen capture of the display screen as the display screen is displaying the video footage and the information.

A computer-readable medium, according to particular embodiments, stores computer executable instructions for: (1) receiving video footage taken by a handheld device; (2) identifying one or more indicia associated with a point of interest within the video footage, the one or more indicia comprising written text; (3) using the one or more indicia to retrieve information associated with the point of interest; (4) displaying the information on a display screen associated with the handheld device; and (5) recording a screen capture of the display screen as the display screen is displaying the video footage and the information.

BRIEF DESCRIPTION OF THE DRAWINGS

Figure 1:
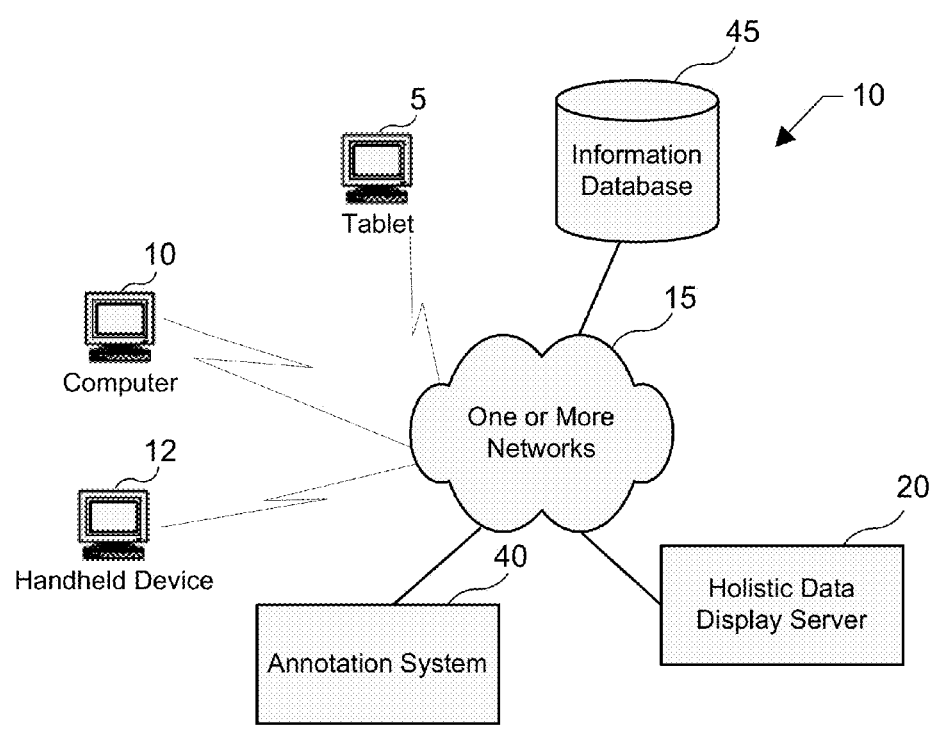

Having thus described various embodiments in general terms, reference will now be made to the accompanying drawings, which are not necessarily drawn to scale, and wherein:

FIG. 1 is a block diagram of a holistic display system according to one embodiment.

Figure 2:
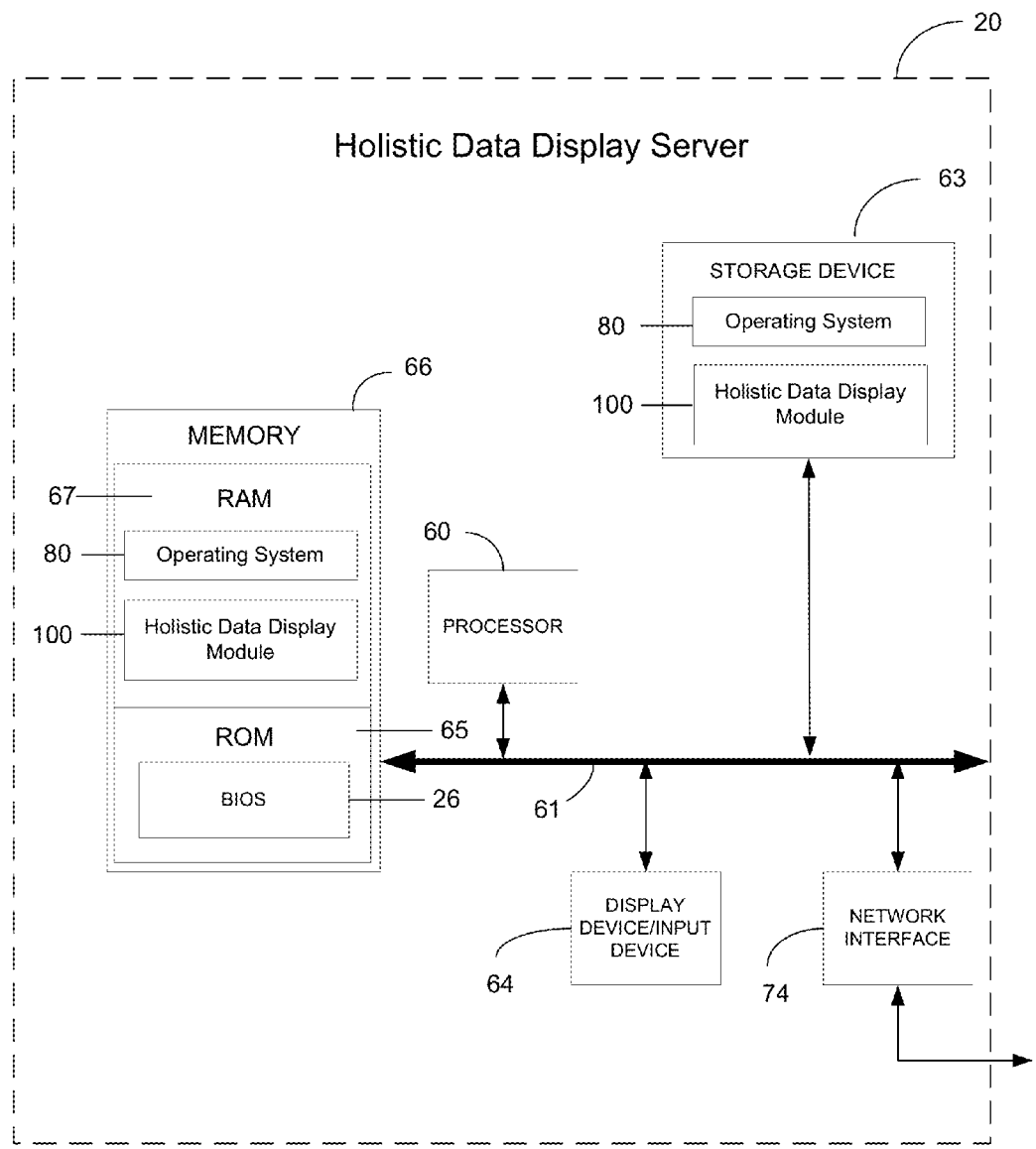

FIG. 2 is a block diagram of a Holistic Data Display Server of FIG. 1.

Figure 3:
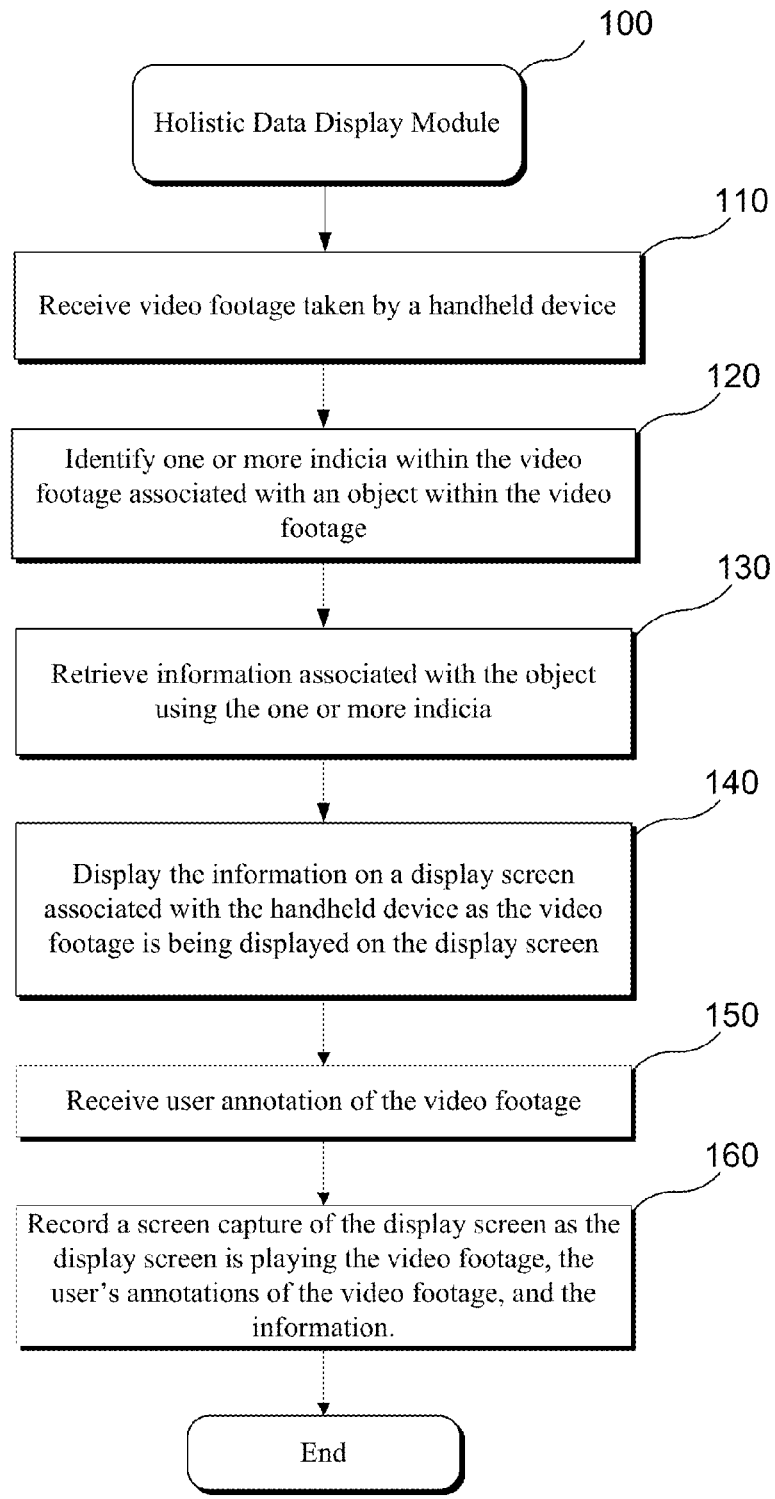

FIG. 3 is a flowchart that generally illustrates a Holistic Data Display Module according to a particular embodiment.

FIGS. 4-10 are screen displays according to a particular embodiment showing an exemplary user interface.

DETAILED DESCRIPTION OF VARIOUS EMBODIMENTS

Various embodiments will now be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Situations may arise where a person who is operating, servicing or otherwise using one or more given pieces of equipment, machines, assemblies, other objects or collections of objects, or other Points Of Interest requires the assistance of a knowledgeable consultant or analyst (e.g., who is not present) in order to resolve some issue or identify a course of action that will rectify or improve the Point of Interest's function or performance. The issue may be further aggravated when the operator lacks the ability, skills, experience or direction to convey adequate information to the skilled consultant through traditional channels (such as a phone call, email, document or video recording) to allow resolution. In these cases, resolution may require the consultant to travel to the location of the POI in order to render assistance.

In particular embodiments, a mobile computing device (such as a laptop computer, tablet computer, smart phone, or similar device) can be used to acquire and combine data from different sources and formats and combine them into a single holistic presentation. In various embodiments, this presentation, which may combine video or still images, audio, live data, archived data, and/or user observations retains much of the advantages of being onsite. In particular embodiments, the presentation can be shared live with a remote consultant, or archived as a file and sent through traditional channels (e.g., email, ftp, disk, or network transfer).

In various embodiments, the system may allow for a more effective and efficient analysis of the Point of Interest by the recipient by presenting data in much the same way as would be experienced if the recipient were onsite rather than remote. Further, in particular embodiments, the method of capturing and combining data allows the inference of metadata about the POI and its environment that would otherwise be lost, missing, or less obvious to analysis than when reviewing the data individually.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary System Architecture

FIG. 1 shows a block diagram of a Holistic Data Display System 5 according to a particular embodiment. As may be understood from this figure, in this embodiment, the Holistic Data Display System 5 includes a Holistic Data Display Server 20, an Annotation System 40, one or more computer networks 15, an Information Database 45, at least one Tablet Computer 7 (e.g., a tablet computer, such as an iPad 2 having an integrated video camera and microphone), at least one Desktop Computer 10, and at least one Handheld Computing Device 12. The one or more computer networks 15 facilitate communication between the Tablet Computer 7, Desktop Computer 10, Handheld Computing Device 12, and Holistic Data Display Server 20, Annotation System 40, and Information Database 45. These one or more computer networks 15 may include any of a variety of types of computer networks such as the Internet, a private intranet, a public switch telephone network (PSTN), or any other type of network known in the art. In certain variations of the embodiment shown in FIG. 1, the communication link between the Tablet Computer 5, Desktop Computer 10, and Handheld Computing Device 12, Holistic Data Display Server 20, Annotation System 40, Information Database 45, are implemented via the Internet using Internet protocol (IP). The communication link between the Holistic Data Display Server 20 and the Information Database 45 may be, for example, implemented via a Local Area Network (LAN).

FIG. 2 shows a block diagram of an exemplary embodiment of the Holistic Data Display Server 20 of FIG. 1. The Holistic Data Display Server 20 includes a processor 60 that communicates with other elements within the Holistic Data Display Server 20 via a system interface or bus 61. Also included in the Holistic Data Display Server 20 is a display device/input device 64 for receiving and displaying data. This display device/input device 64 may be, for example, a keyboard, voice recognition, or pointing device that is used in combination with a monitor. The Holistic Data Display Server 20 further includes memory 66, which preferably includes both read only memory (ROM) 65 and random access memory (RAM) 67. The server's ROM 65 is used to store a basic input/output system 26 (BIOS) that contains the basic routines that help to transfer information between elements within the Holistic Data Display Server 20.

In addition, the Holistic Data Display Server 20 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for the Holistic Data Display Server 20. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80 and a Holistic Data Display Module 100. The Holistic Data Display Module 100 controls certain aspects of the operation of the Holistic Data Display Server 20, as is described in more detail below, with the assistance of the processor 60 and an operating system 80.

Also located within the Holistic Data Display Server 20 is a network interface 74 for interfacing and communicating with other elements of a computer network. It will be appreciated by one of ordinary skill in the art that one or more of the Holistic Data Display Server 20 components may be located geographically remotely from other Holistic Data Display Server 20 components. Furthermore, one or more of the components may be combined (e.g., the Annotation System 40 may be part of the Tablet Computer 7), and additional components performing functions described herein may be included in the Holistic Data Display Server 20.

Exemplary System Module

As noted above, various aspects of the system's functionality may be executed by certain system modules, including the system's Holistic Data Display Module 100. This module is discussed in greater detail below.

Holistic Data Display Module

FIG. 3 is a flow chart of an exemplary Holistic Data Display Module 100. As may be understood from FIG. 3, certain embodiments of the Holistic Data Display Module 100 are configured to allow a user to record a screen capture of video footage of a point of interest that includes information about the point of interest and annotations of the video footage made by the user. For example, a user may record a screen capture of video footage of a storage tank that includes information about the pressure in the tank as well as the user's hand written annotations about the tank.

Beginning at Step 110, the system receives video footage taken by a handheld computing device such as a smart phone, laptop computer, tablet computer, or other similar device. The system then, at Step 120, identifies one or more indicia within the video footage associated with a point of interest, or other point of interest (POI), within the video footage. The point of interest may be, for example, a piece of industrial equipment such as a storage tank, a car in a car sales lot, a storage container in a warehouse loading dock, a human being such as a patient in a hospital, or any other Point of Interest (POI). The one or more indicia within the video footage may include, for example, a bar code, a QR code, written text, a Microsoft Tag, an RFID Tag, or any other suitable identifying indicia.

The system then uses the indicia to retrieve, at Step 130, information associated with the object or other point of interest. This process may, for example, involve: (1) reading the indicia; and (2) using the information obtained from the indicia to retrieve information associated with the point of interest. For example, if the indicia is a QR code, the system may first read the QR code to determine an alphanumeric code associated with the point of interest. The system may then use the alphanumeric code to access information about the point of interest from a database. Similarly, if the indicia is written text, the system may first use OCR techniques to identify the alphanumeric characters included in the text. The system may then use the alphanumeric text to access information about the point of interest from a database. As a particular example in which a storage tank is the relevant point of interest, a QR code may serve as an indicia that may be used to retrieve information from a database about the tank including the tank's pressure, temperature, fluid levels, or other data relating to the tank.

In particular embodiments, the system may be configured to, at Step 130, receive dynamic information about a point of interest at a particular time. For example, the system may report the pressure of a storage tank taken an hour earlier. In other embodiments, the system may be adapted to communicate a current status of the point of interest as the video of the point of interest is taken. For example, the system may report a substantially current (e.g., current) reading of a storage tank's pressure as the video of the storage tank is being taken. In particular embodiments, the system may retrieve the information, for example, from a measurement device such as a temperature sensor, pressure sensor, fuel gauge or other suitable measurement device, or a computer associated with such measurement devices.

Next, at Step 140, the system displays the information on a display screen associated with the handheld device as the video footage is being displayed on the display screen. The information may be displayed, for example, as a graphical overlay on the display screen. At Step 150, the system then receives user annotation of the video footage, which may include, for example, handwritten or typed annotations, sketches, or verbal annotations received by the handheld device. In the case of handwritten annotations or sketches, the system may be adapted to allow a user to use their finger or a stylus to create such annotations or sketches by drawing or writing directly on the handheld device's display screen. In the case of verbal annotations, the system may be adapted to use a microphone (e.g., a microphone associated with the handheld device) to record the annotations as video footage is being displayed on the handheld device's display screen.

As a particular example, a user may annotate the information displayed about the point of interest and/or the video of the point of interest, with the user's observations. For example, if alphanumeric information displayed on the handheld device's display screen indicates that a tank is at a particular pressure, a user may note that the pressure is too high. The system may be further adapted to record information such as a user's spoken statement "The pressure is too high." or other sounds, such as ambient sounds of the point of interest.

At Step 160, which may be implemented, for example, concurrently within one or more of Steps 110-150, the system records: (1) a video screen capture of the handheld device's display screen as the display screen is displaying the video footage, the user's annotations of the video footage, and the information about the point of interest that is being displayed on the handheld device's display screen; and (2) any audio output generated by the handheld device while the video screen capture is being made. In various embodiments, the system may be adapted to record the video footage, user's annotations, and information into a single file. In particular embodiments, replaying the single file substantially recreates the display and/or audio generated by the handheld device at a particular point in time or over a particular length in time.

Also, in particular embodiments, the system may be adapted to share the recorded video footage, annotations, and information, e.g., substantially instantaneously (e.g., instantaneously), with a remote user. For example, a user may be annotating a live video recording on a wireless device while the user's annotations, the video footage, and dynamic information is transmitted via wireless connection or other appropriate network (e.g., via live streaming) to the remote user. In other embodiments, the system may store the information locally, on a remote server, or in any other suitable manner, and the system may be adapted to allow the user to send the recording to a remote user via any suitable file sharing method (e.g., via an e-mail, thumb drive, compact disk, FTP, or any other suitable method).

Exemplary User Interface

Figure 4:
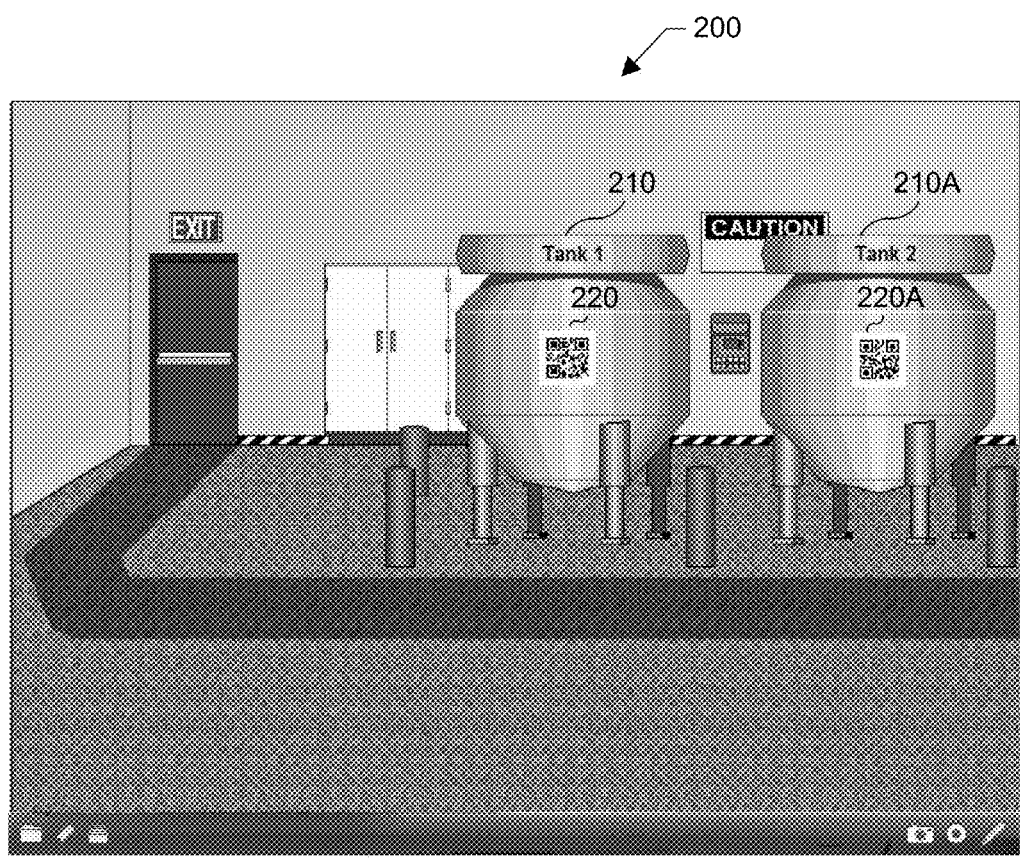

FIGS. 4-10 show an exemplary user interface for a particular embodiment of a Holistic Data Display System. FIG. 4 shows the display screen of a handheld device (e.g., an iPad, tablet, or other suitable hand held device). As may be understood from this figure, the display includes an exemplary user interface displaying video footage that is taken by the handheld device's onboard camera and that reflects the immediate environment of particular points of interest. In this example, the points of interest are two tanks 210, 210A that have been marked with QR codes 220, 220A. In this figure, the user is pointing the handheld device's camera at the tanks 210, 210A so that the image captured by the camera includes both the tanks 220, 220A and the tanks' QR codes 220, 220A.

Figure 5:
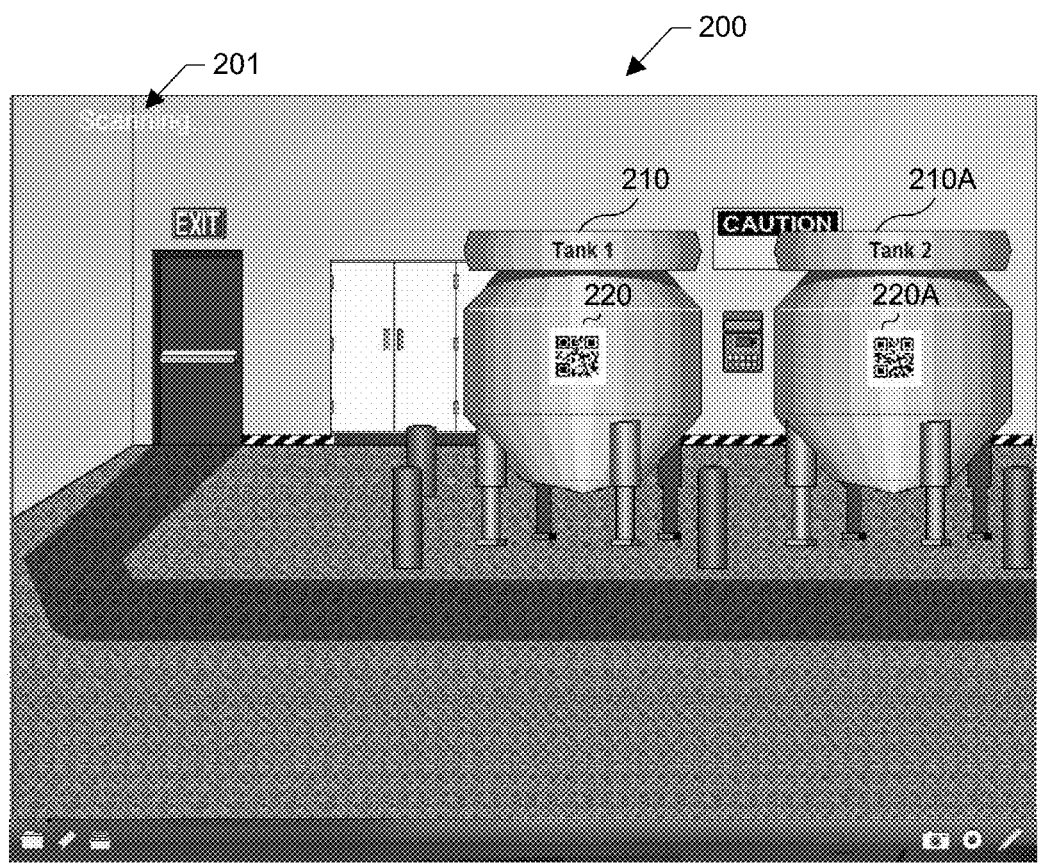
Figure 6:
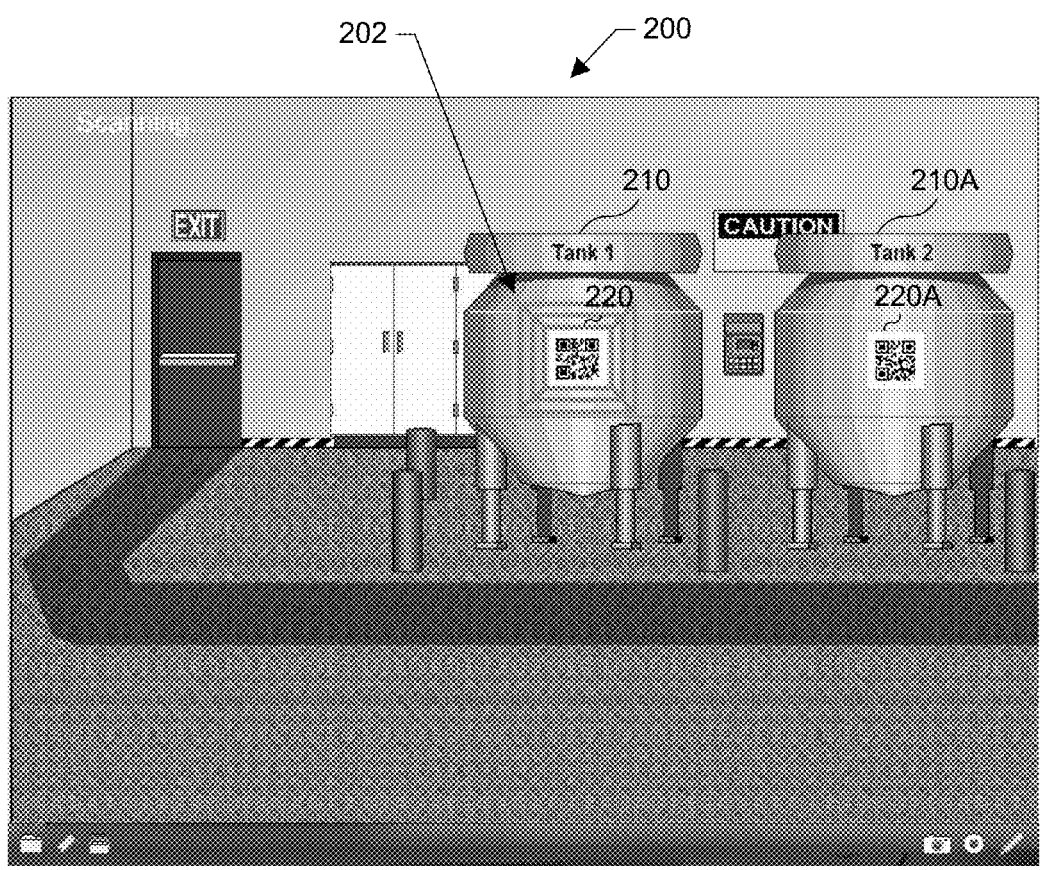

As may be understood from FIGS. 5 and 6, the user interface displays status information to the user as the system scans for indicia associated with particular points of interest. FIG. 5 displays a message 201 indicating that the system is scanning for indicia, and FIG. 6 displays a graphical indicator 202 indicating that the system is reading a particular QR code that the system found during the scan.

Figure 7:
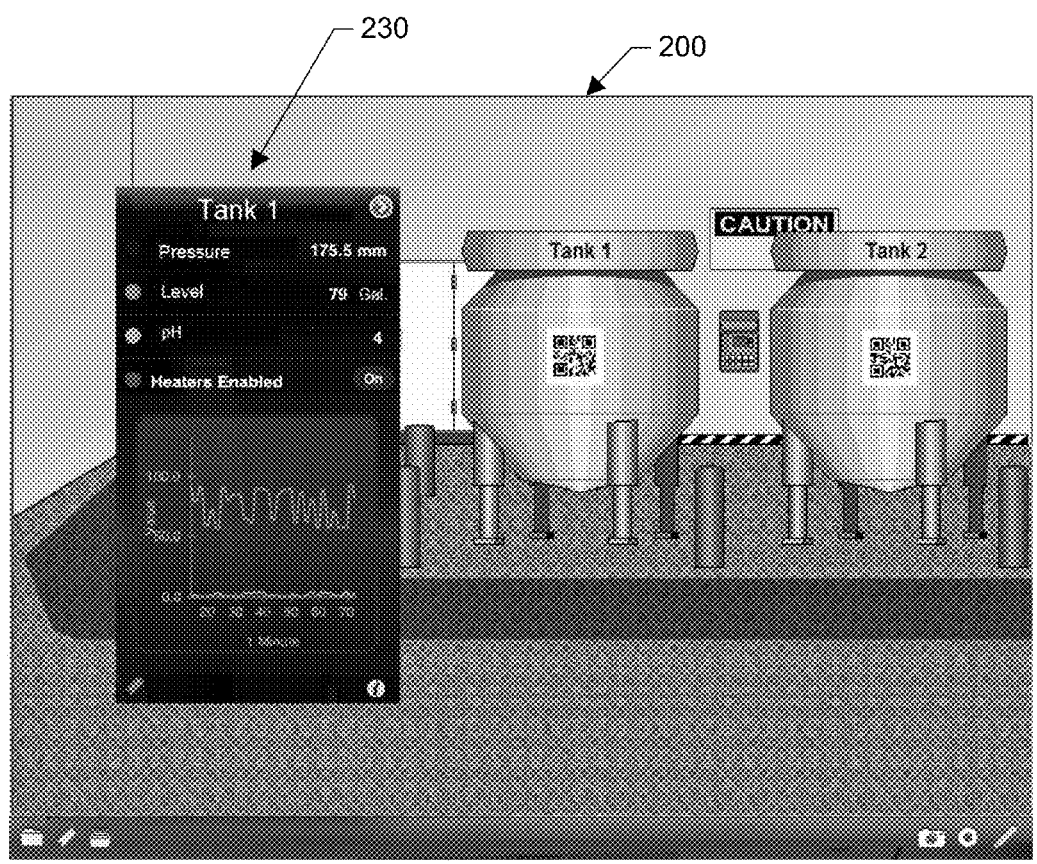

As shown in FIG. 7, the user interface displays information 230 associated with the particular indicia that the system found during the scan. In this case, the system scanned the QR code of Tank 1 and retrieved relevant data about the tank from a remote database that was being continuously populated with data from a computer associated with Tank 1 (and/or various measurement instruments associated with Tank 1). Such data includes the tank's pressure, fill level, and pH. The display may also include one or more graphical representations of information, such as the graph shown in FIG. 7. The system displays the data on the user interface for the user to see. In particular embodiments, the data that the system displays based on the QR code or other indicia may be substantially current data (e.g., current data) data relating to the point of interest (in this case, the tank).

Figure 8:
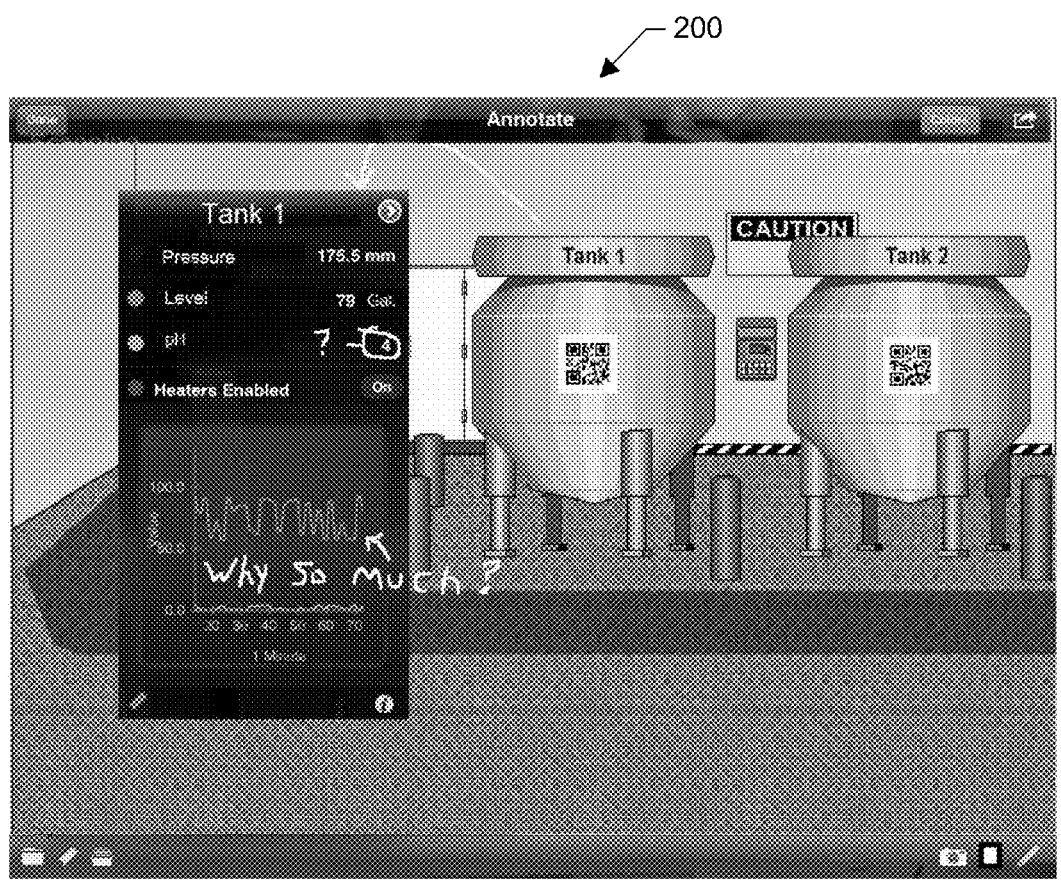

As shown in FIG. 8, the user may place the system into a recording mode in which the system may, for example, record one or more screen captures (e.g., still or video screen captures) of the display screen including the data, and/or record ambient audio via the handheld device's onboard microphone. As may be understood from FIG. 8, the system may, for example, be adapted to allow the user to record observations by drawing, writing, or sketching (e.g., directly on the handheld device's display screen), or by speaking into the handheld device's microphone. These observations may overlay the environmental representation on the data display as shown on the user interface of FIG. 8. (For example, in FIG. 8, the user's annotations, which include a hand drawn circle and question mark, express surprise about Tank 1's current pH level. This figure also includes written text ("why so much?") indicating that the user does not understand why the numerical values of data displayed in the chart of FIG. 8 is so high.

Figure 9:
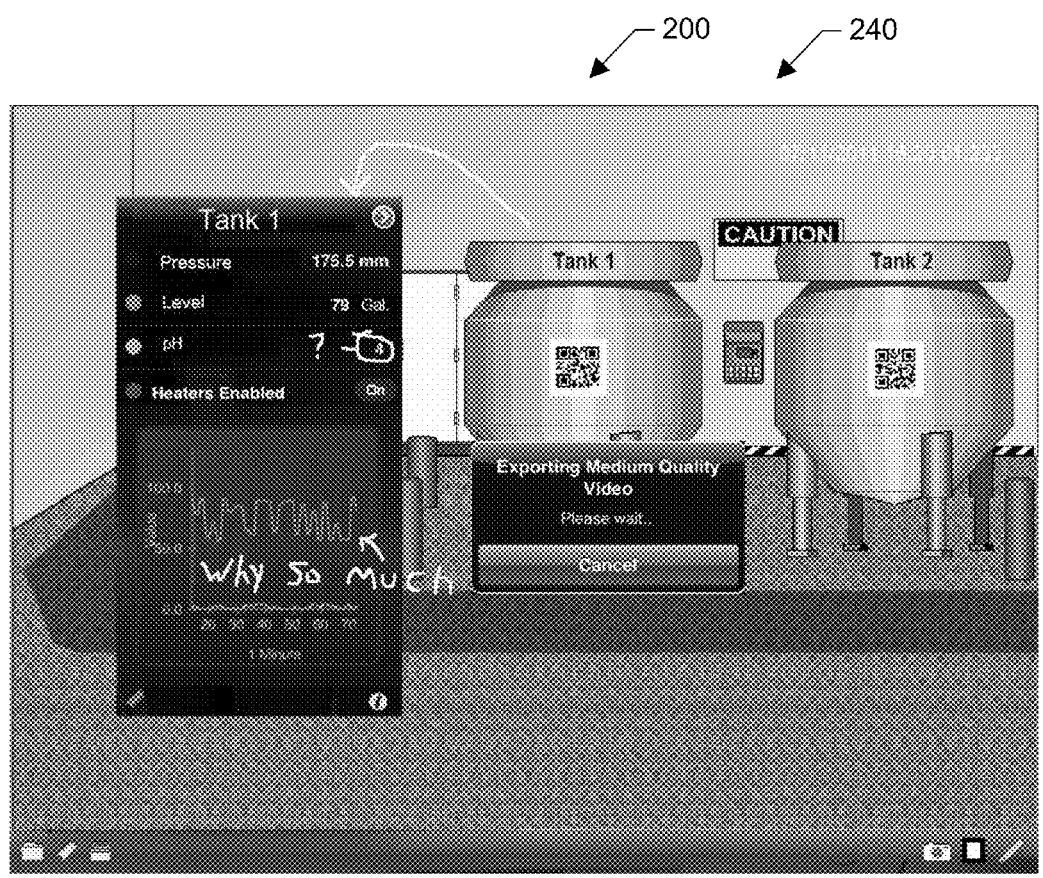
Figure 10:
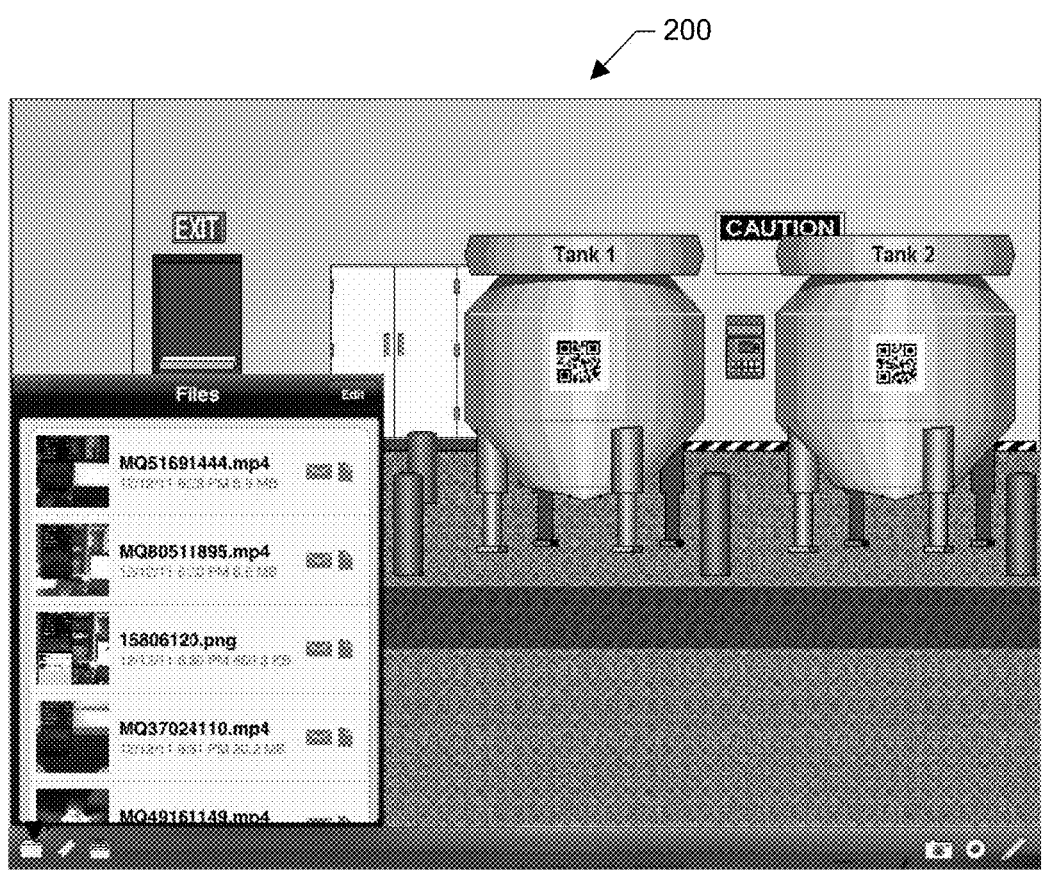

Once the desired information has been presented on the display screen, the user may stop the recording and export the recorded file as shown in FIG. 9. In various embodiments, the recorded file includes one or more images that includes all of the information shown in FIG. 8 along with related (e.g., concurrently recorded) sound information. The recorded file may be saved locally, on a remote storage server over a network, or in any other suitable location. Also, in various embodiments, a user may access the recorded files via a file manager as shown in FIG. 10 and send the recorded files to second parties using e-mail or other suitable file transfer methods.

First Illustrative Example

Used Car Lot

In a first example of a holistic data display system, the system is utilized in a used car sales lot where a particular vehicle serves as the object (or other point of interest) in Step 120 of the holistic data display module, and the vehicle's Vehicle Identification Number (VIN) serves as the indicia at Step 120 that is associated with the vehicle and that is used to retrieve information about the vehicle. In the context of the used car sales lot, a user may utilize a handheld device (e.g., a tablet, such as an iPad, or other suitable handheld device) to capture video of a particular vehicle at Step 110. The system may then identify the indicia, here the vehicle's VIN number, at Step 120 by any suitable method (e.g., by using OCR techniques, by scanning a bar code on the vehicle, or by manual entry of the VIN by the user via an on screen keyboard).

The system may then, at Step 130, retrieve information associated with the object using the one or more indicia. Here, the information retrieved via the vehicle's VIN number may include information from a database regarding the vehicle's make, year, model, mileage, maintenance history, warranty information, cost, and/or other useful information relating to the vehicle. At Step 140, the system displays this supplemental information on a display screen associated with the handheld device as the video footage is displayed on the display screen, and the user may then, at Step 150, annotate the video footage as described above. The user may, for example, annotate the video footage of the car and overlaid information to point out specific features of the car. At Step 160, the system records a screen capture of the display screen as: (1) the display screen is playing the video footage of the vehicle; (2) the display screen is displaying the supplemental information relating to the vehicle; and (3) the user is making user annotations, such as verbal comments that are captured by the handheld device's microphone, or written notes that are captured by the handheld device's touchscreen display. A user may then, for example, upload the recording to a web site to share with potential customers, share the recording with other car dealerships to compare inventory, or use the recording in any other suitable manner.

Second Illustrative Example

Loading Dock

In a second illustrative example of a holistic data display, the system is utilized in a warehouse loading dock. In the warehouse loading dock, the system, at Step 110, receives video footage taken by a handheld computing device (e.g., a tablet computer such as an iPad or other suitable handheld device). The video footage may be, for example, video footage of a particular point of interest in the loading dock, such as a box of lawnmower parts. The system then, at Step 120, identifies an indicia within the video footage associated with the box of lawnmower parts such as a loading dock number. The system may identify the loading dock number via any suitable method (e.g., by scanning a barcode or QR code on the box of lawnmower parts or via manual entry of the loading dock number by the user).

The system then retrieves, at Step 130, information associated with the box of lawnmower parts from, for example, a company database, a vendor website, or other suitable source. The information may include, for example, the number of boxes of lawnmower parts processed per hour at the loading dock, whether there are any orders for lawnmower parts that are waiting to be processed, or any other information relating to the box of lawnmower parts. The system may then display, at Step 140, the information retrieved at Step 130 on the display screen of the handheld device along with the footage of the box of lawnmower parts. Next, the system may, at Step 150, receive user annotations (e.g., handwritten annotations, sketches, or audio annotations) that may include notes concerning, for example, a need to order more lawnmower parts, a proposal to improve the number of boxes of lawnmower parts processed per hour, or any other annotations related to the box of lawnmower parts.

At Step 160, the system records a screen capture of the display screen as the display screen is playing footage of the box of lawnmower parts, displaying the information relating to the box of lawnmower parts, and showing the user's annotations. The user may then share the recorded screen capture with other loading dock employees, with loading dock planning managers, or with anyone else who may need to see information relating to the box of lawnmower parts.

Other Suitable Uses

As should be understood in light of this disclosure, the system described above may be used in a variety of different contexts. For example, the system may be used in a medical context. In such an embodiment, the system may, for example, be equipped with biometric human recognition software (facial recognition software) that the system may use to retrieve information regarding a particular patient at Step 130, above. In a particular example, the individual's face may be used as a unique indicia to identify a particular individual (rather than written or printed "indicia" as described in certain examples above in regard to Step 130). The system may similarly be equipped with object recognition software that is used to identify a particular object based on the object's appearance, rather than a printed indicia associated with the object.

As a further example, the system may be used in the field of auto diagnostics. For example, a handheld device may be used by a layperson to capture video and audio of their car's engine while it is running and to simultaneously display information regarding the vehicle on top of (or adjacent) the video of the car. Such information may include, for example, the car's oil pressure, engine temperature, oil fill level, and any other suitable information.

Also, while the system is described above as recording video of a particular point of interest and having the system and/or user enhance the video with additional information (e.g., live information) regarding the point of interest, in other embodiments, the system may be adapted to record only the sound of a particular point of interest and to have the system and/or user enhance the audio recording with additional information (e.g., live information) regarding the point or interest. In various embodiments, the system may use one or more audio indicia—rather than visual indicia—as a basis for identifying a particular point of interest and then retrieving information from a database regarding the point of interest. In particular embodiments, the audio indicia may be one or more particular sounds associated with the point of interest (e.g., the specific operating sound produced by a particular machine, animal, etc., or a distinct series of tones that are used specifically to identify a particular object).

In certain embodiments, the system may allow a user to select information (e.g., live information) to display on the handheld device's display screen. For example, the system may be adapted to allow a user to use a dropdown listing of different types of information to selectively display a listing of live information, such as the information 230 shown in FIG. 7 on the handheld device's display screen. In particular embodiments, the system may be adapted to allow a user to do this at any time—even when the system is not capturing video of (or sound emitted by) the point of interest that the information is related to.

In other embodiments, the handheld device is adapted to sense when it is adjacent a particular point of interest and to optionally automatically display live information (or other information) related to the point of interest in response to the handheld device sensing that it is within close proximity to (e.g., within about a predetermined distance from) the point of interest. Such information may include, for example: (1) one or more sensor readings from the point of interest; (2) technical information related to the point of interest (e.g., a schematic diagram or user manual for the point of interest); or (3) other suitable information.

In particular embodiments, the handheld device includes an RFID reader for reading one or more RFID tags associated with various points of interest. In such embodiments, the system may be adapted to display particular information regarding a particular point of interest (e.g., live information regarding the point of interest, or other information such as the types of information discussed above) in response to reading an RFID tag associated with the point of interest.

It also should be understood that various embodiments of the invention may omit the recording step described above. In such embodiments, the system may, for example, allow a user who is near the object to view supplemental information regarding the object in real time. Such information may include, for example, information retrieved from the object itself (e.g., one or more sensors associated with the object) or information received from a suitable database.

CONCLUSION

Many modifications and other embodiments of the invention will come to mind to one skilled in the art to which this invention pertains having the benefit of the teachings presented in the foregoing descriptions and the associated drawings. For example, as will be understood by one skilled in the relevant field in light of this disclosure, the invention may take form in a variety of different mechanical and operational configurations. As a particular example, the functionality of the handheld computing device in various embodiments above may be implemented by a non-handheld computing device. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A non-transitory computer-readable medium storing computer executable instructions for:
  (A) receiving video footage taken by a handheld device;
  (B) identifying one or more RFID tags associated with a point of interest that is within said video footage;
  (C) reading said one or more RFID tags to retrieve information associated with said point of interest; and
  (D) displaying said information on a display screen associated with said handheld device as said video footage is being displayed on said display screen.

2. The non-transitory computer-readable medium of claim 1, further comprising computer-readable instructions for:
  (E) recording a screen capture of said display screen as said display screen is displaying said video footage and said information.

3. The non-transitory computer-readable medium of claim 2, wherein said computer-readable medium further stores computer-executable instructions for allowing a user to annotate said video footage; and
  said Step (E) comprises recording said screen capture of said display screen as said display screen is displaying said video footage, said user's annotations of said video footage, and said information.

4. The non-transitory computer-readable medium of claim 3, wherein said user's annotations of said video footage comprise said user's verbal annotations recorded by said handheld device.

5. The non-transitory computer-readable medium of claim 3, wherein said user's annotations of said video footage comprise handwritten annotations.

6. The non-transitory computer-readable medium of claim 2, further comprising computer-readable instructions for saving said screen capture as a single file.

7. The non-transitory computer-readable medium of claim 1, wherein said point of interest is a human being.

8. The non-transitory computer-readable medium of claim 1, wherein said handheld device comprises an RFID reader.

9. The non-transitory computer-readable medium of claim 1, wherein said step of displaying said information on said display screen comprises superimposing said information over said video footage as said video footage is being displayed on said display screen.

10. The non-transitory computer-readable medium of claim 9, wherein said computer-readable medium comprises computer-executable instructions for substantially continuously updating said information to reflect a current status of said point of interest that corresponds to the status of the point of interest at the time that the video being displayed on the display screen was taken.

11. The non-transitory computer-readable medium of claim 1, wherein said information is dynamic information that communicates a current status of said point of interest when the video of the point of interest was taken.

12. The non-transitory computer-readable medium of claim 11, wherein said Steps (A)-(D) are executed at least substantially in real time.

13. The non-transitory computer-readable medium of claim 1, wherein said information associated with said point of interest comprises identifying information for said point of interest.

* * * * *